INVENTOR.
Sam B. Williams.

May 27, 1969
S. B. WILLIAMS
3,446,306
GAS TURBINE FOR AUTOMOTIVE VEHICLES
Original Filed Feb. 1, 1965
Sheet 2 of 5
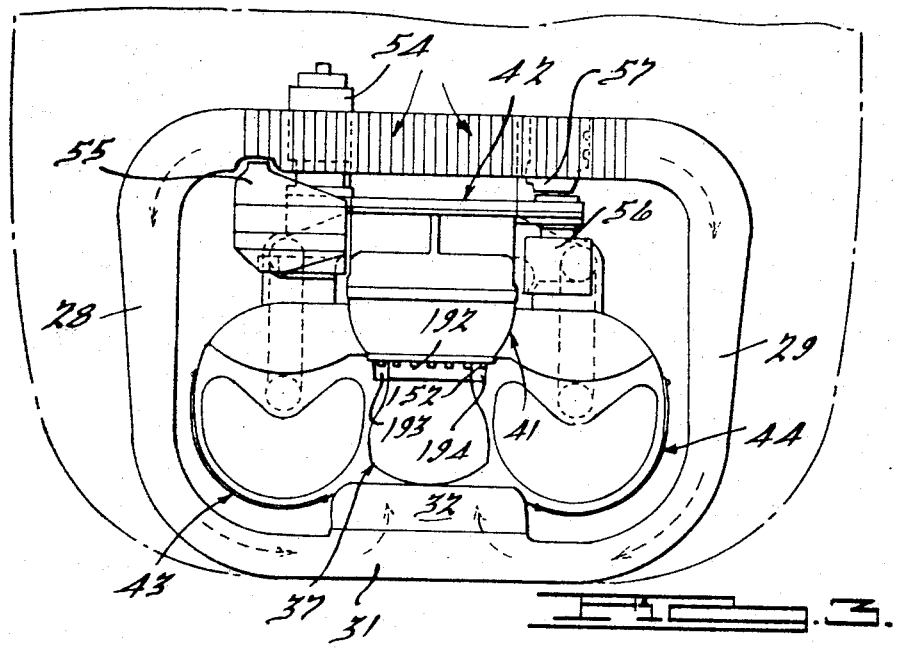
INVENTOR.
Sam B. Williams
BY
Harness, Dickey & Pierce
ATTORNEYS.

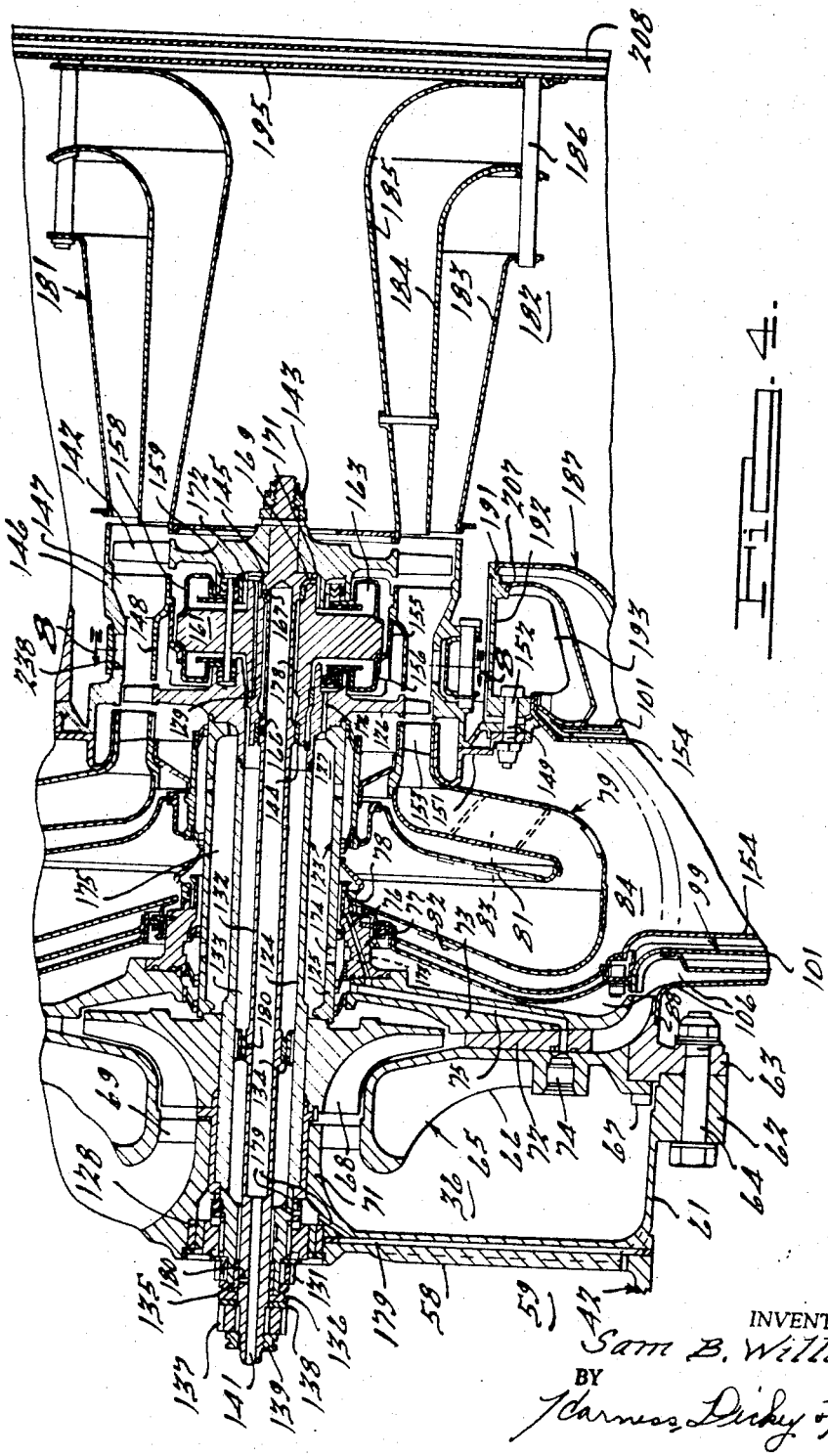

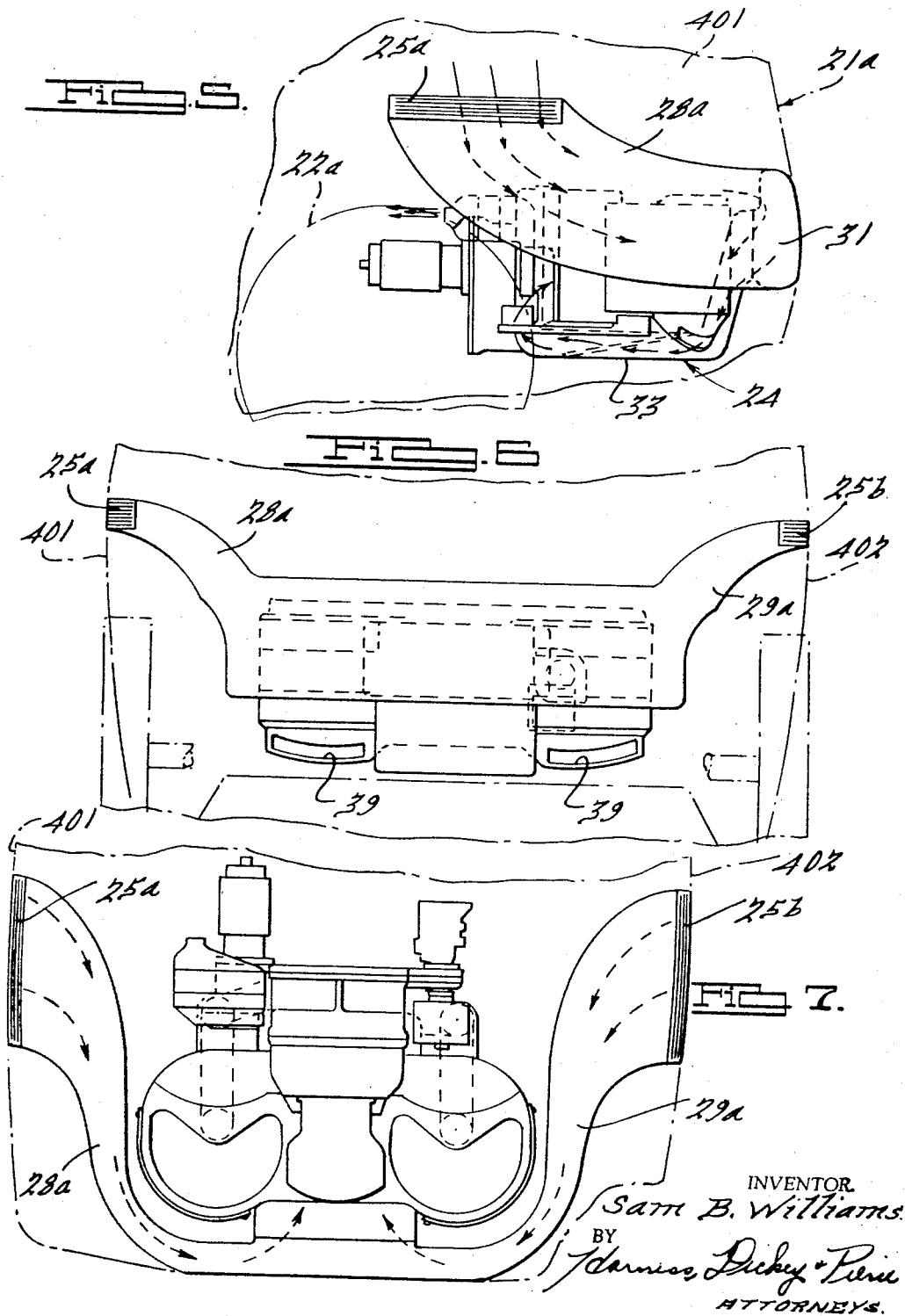

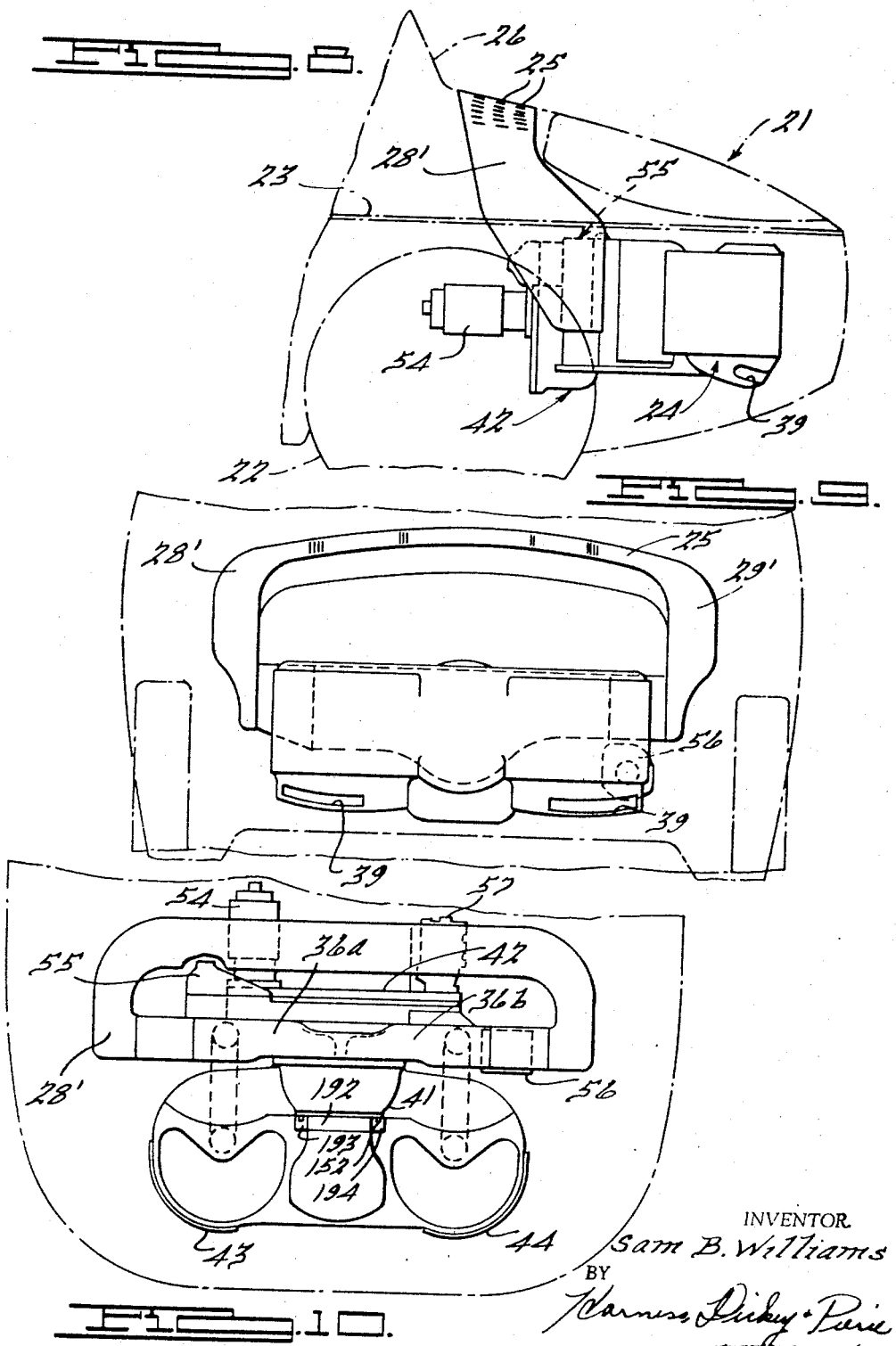

United States Patent Office 3,446,306
Patented May 27, 1969

3,446,306
GAS TURBINE FOR AUTOMOTIVE VEHICLES
Sam B. Williams, Walled Lake, Mich., assignor to Williams Research Corporation, Walled Lake, Mich., a corporation of Michigan
Original application Feb. 1, 1965, Ser. No. 429,600, now Patent No. 3,363,415, dated Jan. 16, 1968. Divided and this application Dec. 12, 1966, Ser. No. 630,475
Int. Cl. B60k 3/04
U.S. Cl. 180—66   7 Claims

ABSTRACT OF THE DISCLOSURE

A vehicle having a rear gas turbine engine beneath the deck, an air intake on the vehicle, a rearwardly facing exhaust gas opening, a permanent connection between a power shaft and vehicle wheels including a power pinion, and a sleeve bearing for the power pinion supported by a compressor shaft.

---

This is a division of application Ser. No. 429,600, filed Feb. 1, 1965, now Patent No. 3,363,415, issued Jan. 18, 1968.

This invention relates to gas turbines, and more particularly to engines of this type especially adapted for use in automotive vehicles.

It is an object of the present invention to provide a novel and improved gas turbine which may be mounted in the rear portion of a vehicle beneath the deck, thereby eliminating the need for exhaust ducts extending beneath the vehicle and greatly simplifying the power train.

It is another object to provide an improved regenerative gas turbine of this character in which the regenerator matrices are on axes spaced laterally from and transverse to the turbine axis, thus creating a relatively flat overall configuration for the unit which has space location advantages.

It is also an object to provide an improved gas turbine of this character in which proper bearing support is insured for the power shaft when it is in stalled condition and thus has its highest bearing load, the construction preventing breakdown of the hydrodynamic load-carrying oil film in the forward power shaft bearing.

Other objects, features and advantages of the present invention will become apparent from the subsequent description, taken in conjunction with the accompanying drawings.

In the drawings:

FIGURE 3 is a top plan view of the vehicle;

FIGURE 4 is a plan view in cross section showing the internal construction of the gas turbine, parts being broken away;

Figure 1:
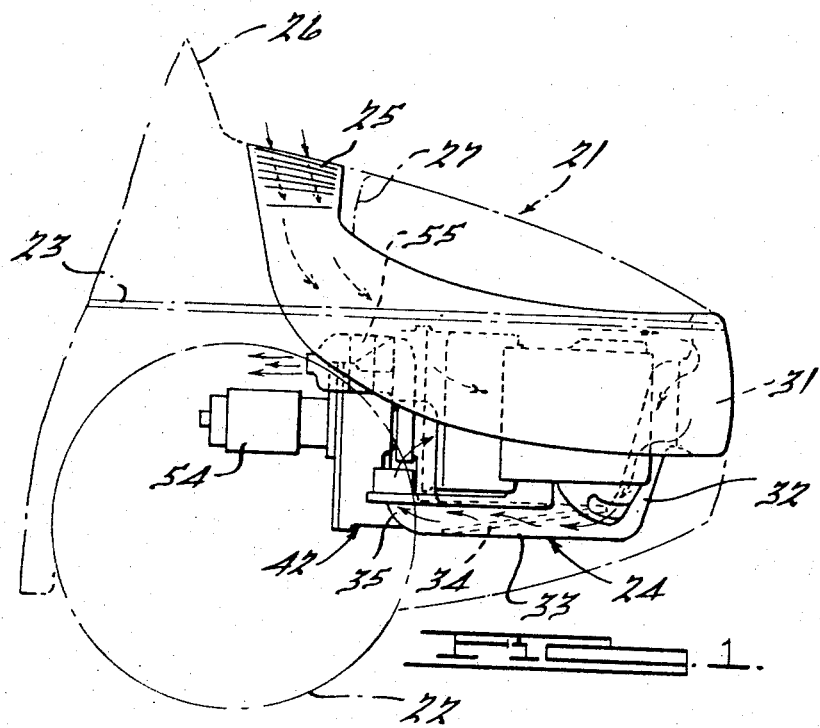
FIGURE 1 is a side elevational view of the rear portion of an automotive vehicle showing the location of the improved gas turbine therein.
Figure 2:
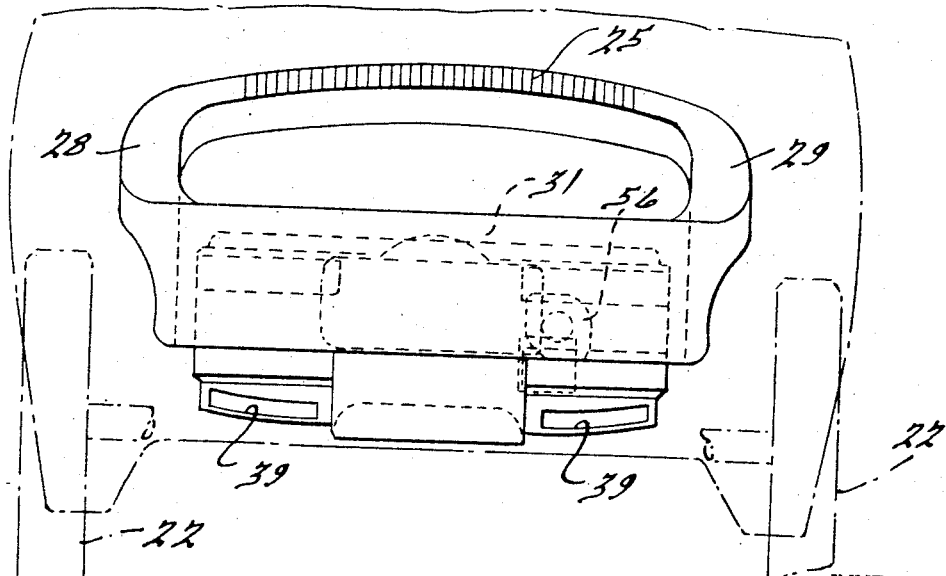
FIGURE 2 is a rear elevational view of the automotive vehicle.

FIGURES 5 to 7 are views similar to FIGURES 1 to 3 respectively, but showing a modified positioning for the intake air grills especially suitable for station wagons; and FIGURES 8 to 10 are views similar to FIGURES 1 to 3 showing another embodiment of the air intake arrangement in which the curved ducts extend directly from the intake grill to a pair of oppositely disposed intake chambers attached to the turbine housing.

Briefly, the illustrated embodiment of the invention comprises a gas turbine engine having a power shaft surrounded by a compressor shaft, with an annular burner surrounding these shafts. The discharge from the radial compressor is fed outwardly to opposite sides of the engine, where it enters four rotary type axial flow regenerators. These regenerators are mounted in two coaxial pairs disposed on opposite sides of the main turbine axis, the two axes of the regenerator pairs being perpendicular to and spaced a considerable distance from the turbine axis. The regenerators of each pair are vertically spaced from each other along their axis. The entire unit has a general or overall configuration slightly resembling a T, that is, the height of the housing is no greater than that needed to accommodate the compressor, burner and turbine wheels, those portions of the housing enclosing the exhaust passages and heat exchanger pairs extending rearwardly and to both sides of the housing portion which encloses the compressor, burner and turbine wheels.

The engine is mounted in the rear portion of an automotive vehicle below the deck, the exhaust gases emitted from the engine being led downwardly and rearwardly from the rearward portions of the housing wings which enclose the regenerators. The exhaust gases may thus be led directly to the atmosphere without the need for additional ducts. The intake air may be fed through grills on the after portion of the vehicle and ducts which pass around both sides of the engine housing and return beneath the engine through a silencer and filter arrangement disposed beneath the engine housing, and thence enter the compressor intake chamber.

The compressor shaft supports the forward bearing of the power shaft, which is a sleeve bearing. This will insure proper bearing support for the power shaft when it is stalled with high torque and therefore exerts maximum load on its bearing, since the compressor shaft will keep rotating and therefore maintain the hydrodynamic load-carrying film.

Referring more particularly to the drawings, and particularly to FIGURES 1 to 3, the reference numeral 21 indicates generally an automotive vehicle having rear wheels 22 and a rear deck 23 beneath which is mounted the gas turbine engine generally indicated at 24. An air intake grill 25 is provided between the rear window 26 of the vehicle and the trunk hood 27, a pair of ducts 28 and 29 leading laterally and rearwardly from the grill and alongside the walls of the trunk to a chamber 31 at the rear of the vehicle. It should be noted that FIGURES 1 to 3 do not fully show portions of the vehicle adjacent the gas turbine, these being merely shown in phantom lines. The length of ducts 28 and 29 will permit trapping of moisture in the intake air. A duct 32 leads downwardly and forwardly from chamber 31 centrally of the vehicle, this duct leading to an air filter and silencer chamber 33 beneath turbine 24. This chamber is of large enough size to accommodate a silencing and filtering unit 34 through which the air flows, the air then being conducted upwardly through a duct 35 to a compressor inlet chamber 36, seen in FIGURE 4.

Exhaust gases from the turbine are fed downwardly and rearwardly from the main turbine housing indicated generally at 37 in FIGURE 6, through louvers 38 in this housing to a pair of exhaust discharge ducts 39 of downwardly and rearwardly flared shape, these ducts having rearwardly facing openings 40. As will be seen in FIGURES 1 and 2, openings 40 are immediately adjacent the underside of the rear end of the vehicle, so that the exhaust gases need not be conducted further by means of conduits but may be emitted directly to the atmosphere.

The general arrangement of the turbine itself is perhaps best seen in FIGURE 3. The exterior of the housing is mainly formed by main housing 37, together with a compressed air housing generally indicated at 41 and a gear box housing generally indicated at 42. These housings are in general alignment along the longitudinal axis of the turbine, but housings 37 and 41 also extend laterally to both sides, forming what might be termed "wings" which are generally indicated in FIGURE 3 at 43 and 44. These wings each contain a pair of rotary type axial flow regenerator matrices, one pair being seen in FIGURE 6 where the upper matrix is generally indicated at 45 and the lower matrix at 46. Each matrix has a solid hub 47 non-rotatably secured to a vertically disposed shaft 48, a solid outer rim 49, and a main portion comprising many axially extending passages 51 formed of heat retaining material. Hot exhaust gases flowing through the passages during one portion of their travel will heat the matrix so that this heat may be transmitted to the compressed air flowing through the same passages during another portion of their travel.

Shaft 48 is supported by an upper bearing 52 and a lower bearing 53, these bearings in turn being secured to main housing 37 in a manner described in detail below. Matrices 45 and 46 are spaced vertically from each other, but it will be noted that except for the downward extent of ducts 39, the total height of the wings 43 and 44 is no greater than that of housings 37 and 41.

Before entering a detailed description of the turbine interior, housing and duct means, it may be well to mention several other accessory components of the engine, seen in FIGURES 1 to 3. A starter 54 is mounted on the forward end of gear box housing 42, as seen in FIGURES 1 and 3, and adjacent the starter is an oil cooler and fan assembly 55, the air from the fan being emitted forwardly as shown by the arrows in FIGURE 1. An alternator 56, seen in FIGURE 2, and a fuel control assembly 57, indicated in FIGURE 3, are also mounted on gear box housing 42.

Gear box housing 42 has an internal wall 58 separating the gear space 59 thereof (see FIGURE 4) from compressor inlet chamber 36. The rearwardly extending wall 61 of gear box housing 42, which encloses chamber 36, has a flange 62, and a compressor support ring 63 is secured thereto by bolts 64. The compressor is generally indicated at 65 and comprises a compressor housing 66 secured to support ring 63 by bolts 67, and compressor blades 68 rotatably mounted within housing 66. Entrance vanes 69 extend radially between housing 66 and a rearwardly extending portion 71 on wall 58. A compressor diffuser 72 having radial ribs 73 is mounted outwardly of the radially extending portions of blades 68, and is adapted to direct the compressed air radially and then axially rearwardly. A fuel supply connection 74 is provided in compressor housing 66 leading to a fuel line 75 in one of the ribs 73. Line 75 leads inwardly to a conduit 76 formed in a member 77 centrally secured to ribs 73, and this conduit leads to an annular space 78 formed by elements secured to member 77 and disposed within an annular combustion chamber generally indicated at 79. This combustion chamber is of the general configuration shown in Williams Patent No. 3,077,076, dated Feb. 12, 1963, having air entrance louvers 81 and 82 together with radial passages 83 for leading heated compressed air from a chamber 84 surrounding the combustion chamber to its interior.

The compressor shaft is generally indicated at 123 and comprises an inner shaft 124 and an outer shaft 125, these shafts extending between first stage turbine wheel 126 and compressor 68 with an annular space 127 therebetween. more particularly, outer shaft 125 extends between an outer portion of the turbine wheel hub and the compressor hub, while shaft 124 extends from an inner portion of the turbine wheel hub through the compressor and through gear box wall 58, the gear box wall supporting a forward compressor shaft bearing 128, as seen in FIGURE 4. A rear bearing 129 is also provided for the compressor shaft, this bearing being disposed within the turbine wheel hub. An accessorry drive pinion 131 is secured to inner compressor shaft 124 on the forward side of wall 58.

A power shaft 132 is provided coaxially within and spaced inwardly from inner compressor shaft 124, a space 133 being produced between shaft 132 and shaft 124. An intermediate bearing 134 for shaft 132 is provided within space 133, and power shaft 132 extends forwardly through wall 58 with a forward bearing 135 being provided within outer compressor shaft 124 forwardly of wall 58 and rotatably supporting power shaft 132. This may be a sleeve type of bearing held in place by a nut 136 threadably mounted on the forward end of outer compressor shaft 124. It will thus be noted that when power shaft 132 is stalled, that is, when it is not rotating because the automotive wheels 22 to which it is geared are held immobile, a hydrodynamic film of oil will still be maintained with respect to bearing 135 because of the fact that it is supported by continuously rotating shaft 124. It does not matter, for this purpose, whether sleeve bearing 135 is fixed to power shaft 132, compressor shaft 124, or neither. The maintenance of the hydrodynamic oil film is quite important when shaft 132 is held immobile since it is at that time that the maximum radial force will be exerted on this shaft.

A power pinion 137 is secured to shaft 132 outwardly of nut 136, being separated therefrom by a thrust washer 138 and being held in place by a nut 139. An axial oil passage 141 is provided within power shaft 132, this passage leading from the forward end of the power shaft through the entire shaft, stopping just short of that portion which is fixed to the hub of second stage turbine wheel 142. This wheel is secured to the rear end of the power shaft by a nut 143.

FIGURES 5 to 7 show a modified air intake arrangement which is basically similar to that previously described, but is especially suited for station wagon installations. In this arrangement, a pair of air intake grills 25a and 25b are located in the quarter panels 401 and 402 of the body of vehicle 21a above rear wheels 22a. These grills are connected by ducts 28a and 29a to chamber 31 at the rear of the vehicle, this chamber leading to air filter and silencer chamber 33 beneath turbine 24 as described above. Grills 25a and 25b may be of rectangular shape, with their long sides extending horizontally, ducts 28a and 29a being of compoundly curved shape to fair into chamber 31 from both sides, as seen particularly in FIGURE 7.

FIGURES 8 to 10 shows still another arrangement, in which a grill 25 is connected to a pair of horizontally extending compressor inlet chambers 36a and 36b by duct means which does not extend to the rear of the vehicle and then underneath the turbine housing, but directly to these two inlet chambers which are mounted on opposite sides of the forward turbine housing portion, as seen in FIGURE 10.

In this arrangement, ducts 28' and 29' lead directly from the opposite ends of grill 25 downwardly and rearwardly to the outer ends of chambers 36a and 35b, resulting in an inclined U-shaped arrangement for both ducts, as seen in FIGURE 10. Silencing and filtering units (not shown) are located within ducts 28' and 29'. It will be apparent that the location of the air intake grill or grills shown in FIGURES 8 to 10 could be varied to suit individual requirements. For example, these grills could be located in the quarter panels of station wagons, as indicated in the embodiment of FIGURES 5 to 7.

What is claimed is:

1. In combination, an automotive vehicle having rear wheels, a gas turbine engine mounted at the rear of said vehicle, said gas turbine engine being of the regenerative type and having a main turbine axis extending longitudinally of the vehicle and rotary type axial flow regenerator matrices mounted on substantially vertical axes spaced on opposite sides of the main turbine axis, a housing for said engine, the upper and lower extremities of the portions of said housing surrounding said matrices being substantially within the confines of the upper and lower extremities of the housing portion surrounding the remainder of said engine, drive means at the forward portion of said engine connected to said wheels, and a pair of rearwardly facing exhaust gas openings in said housing below the rearward portions of said matrices.

2. In combination, an automotive vehicle having rear wheels, a gas turbine mounted at the rear of said vehicle, said gas turbine engine being of the regenerative type and having a main turbine axis extending longitudinally of the vehicle and a rotary type axial flow regenerator matrix mounted on a substantially vertical axis to one side of said main turbine axis, a housing for said engine, the upper and lower extremities of that portion of the housing surrounding said matrix being within the confines of the upper and lower extremities of the housing portions surrounding the remainder of the turbine, driving means at the forward portion of said engine connected with said rear wheels, and a rearwardly facing exhaust gas opening in said housing beneath the rearward portion of said matrix.

3. In combination, an automotive vehicle having rear wheels, a gas turbine engine mounted at the rear of said vehicle, drive means connecting said engine with said rear wheels, an air intake for said engine at a portion of said vehicle above and forward of the engine, duct means leading from said air intake past said engine to the rear portion of said vehicle and then forwardly under said engine, filter and silencer means in said duct means under said engine, a housing for said engine, and a rearwardly facing exhaust gas opening in said housing leading directly to the atmosphere.

4. In combination, an automotive vehicle having rear wheels, a gas turbine engine mounted at the rear of said vehicle, said gas turbine engine being of the regenerative type and having a main turbine axis extending longitudinally of the vehicle and rotary type axial flow regenerator matrices mounted on substantially vertical axes spaced on opposite sides of the main turbine axis, an air intake for said engine at a portion of said vehicle above and forward of the engine, duct means leading from said air intake past said engine to the rear portion of said vehicle and then forwardly under said engine, filter and silencer means in said duct means under said engine, a housing for said engine, the upper and lower extremities of the portions of said housing surrounding said matrices being substantially within the confines of the upper and lower extremities of the housing portion surrounding the remainder of said engine, drive means at the forward portion of said engine connected to said wheels, and a pair of rearwardly facing exhaust gas openings in said housing below the rearward portions of said matrices.

5. In combination, an automotive vehicle having quarter panels and rear wheels, a gas turbine engine mounted at the rear of said vehicle, drive means connecting said engine with said rear wheels, a pair of air intake grills for said engine in said quarter panels, a housing for said engine, duct means leading from said grills to said housing past the sides of said engine to the rear portion of said vehicle and forwardly under said engine, filter and silencing means in said duct means under said engine, and a rearwardly facing exhaust gas opening in said housing leading directly to the atmosphere.

6. In combination, an automotive vehicle having rear wheels and a rear deck, a gas turbine engine mounted at the rear of said vehicle and having at least a major portion mounted below said rear deck and rearwardly of said wheels, an air intake for said engine at a portion of said vehicle above and forward of the engine, a housing for said engine, a gear box at the forward end of said housing, drive means connecting said gear box with said rear wheels, a pair of air inlet chambers extending from opposite sides of the forward portion of said housing, duct means leading from said air intake to the outer ends of said air inlet chambers, and a rearwardly facing exhaust gas opening in the lower rear portion of said housing leading directly to the atmosphere.

7. The combination according to claim 6, said air intake comprising a grill disposed between the rear window and deck lid of said vehicle, said duct means comprising an inclined U-shaped pair of ducts leading from the outer ends of said grill to the outer ends of said air inlet chambers.

References Cited

UNITED STATES PATENTS

| | | | |
|---|---|---|---|
| 2,060,612 | 11/1936 | Dake | 180—66 |
| 2,033,731 | 3/1936 | Nallinger | 180—54 |
| 2,591,540 | 4/1952 | Grylls | 180—66 |
| 2,854,085 | 9/1958 | Bachle | 180—66 |
| 2,994,394 | 8/1961 | Underwood | 180—66 |

FOREIGN PATENTS

| | | |
|---|---|---|
| 1,242,351 | 8/1960 | France. |
| 706,070 | 3/1954 | Great Britain. |
| 420,616 | 4/1947 | Italy. |
| 473,598 | 8/1952 | Italy. |

RICHARD J. JOHNSON, *Primary Examiner.*

MILTON L. SMITH, *Assistant Examiner.*